(12) United States Patent
Eubanks et al.

(10) Patent No.: US 11,947,860 B2
(45) Date of Patent: Apr. 2, 2024

(54) MAPPING INCOMPATIBLE WINDOWING TOPOGRAPHIES ACROSS OPERATING SYSTEMS

(71) Applicant: MICROSOFT TECHNOLOGY LICENSING, LLC, Redmond, WA (US)

(72) Inventors: Nick Eubanks, Redmond, WA (US); Darshak Harisinh Bhatti, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/846,978

(22) Filed: Jun. 22, 2022

(65) Prior Publication Data
US 2023/0376263 A1    Nov. 23, 2023

Related U.S. Application Data

(60) Provisional application No. 63/344,503, filed on May 20, 2022.

(51) Int. Cl.
*G06F 3/14* (2006.01)
*G06F 9/455* (2018.01)

(52) U.S. Cl.
CPC .......... *G06F 3/1454* (2013.01); *G06F 3/1415* (2013.01); *G06F 9/455* (2013.01)

(58) Field of Classification Search
CPC ........ G06F 3/011; G06F 3/017; G06F 3/0482; G06F 3/04842; G06F 3/04845;
(Continued)

(56) References Cited

U.S. PATENT DOCUMENTS

| 2003/0142037 A1* | 7/2003 | Pinedo | G06F 3/1423 |
| | | | 345/1.1 |
| 2008/0034320 A1* | 2/2008 | Ben-Shachar | G09G 5/14 |
| | | | 715/790 |

(Continued)

FOREIGN PATENT DOCUMENTS

CN    111736789 A    10/2020

OTHER PUBLICATIONS

"International Search Report and Written Opinion Issued in PCT Application No. PCT/US23/012978", dated May 9, 2023, 13 Pages.

*Primary Examiner* — William Boddie
*Assistant Examiner* — Alecia D English
(74) *Attorney, Agent, or Firm* — David W. Foster; Newport IP, LLC

(57) ABSTRACT

The techniques described herein improve user interface consistency when presenting a guest application running on a guest operating system as if it were a native application running on a host operating system. Specifically, window placement limitations imposed by the guest operating system are overcome by coordinating size and location between the guest application and a host proxy application. When the proxy application is confined to a single display, the size and location of the guest application and corresponding proxy application are synchronized. When the proxy application is moved or resized so as to be rendered on multiple displays, the application hosting engine decouples the location synchronization, leaving the guest application within a single display. Before being forwarded to the guest application, user interface events received by the proxy application are adjusted according to the different locations of the guest application and the proxy application.

18 Claims, 13 Drawing Sheets

(58) Field of Classification Search
CPC ......... G06F 2203/04803; G06F 3/0486; G06F 13/00; H04N 7/15; H04N 5/2628
USPC .................................................. 345/2.2, 214
See application file for complete search history.

(56) References Cited

U.S. PATENT DOCUMENTS

| | | | |
|---|---|---|---|
| 2011/0083102 A1* | 4/2011 | Adachi | G06F 3/0481 715/800 |
| 2017/0024100 A1* | 1/2017 | Pieper | H04L 67/01 |
| 2019/0121682 A1 | 4/2019 | Adiletta et al. | |
| 2021/0048933 A1* | 2/2021 | Shah | G06F 3/0481 |
| 2021/0096732 A1* | 4/2021 | Sonnino | G06F 3/04842 |
| 2021/0326093 A1 | 10/2021 | Hinckley et al. | |

* cited by examiner

MAPPING INCOMPATIBLE WINDOWING TOPOGRAPHIES ACROSS OPERATING SYSTEMS

PRIORITY APPLICATION

The present application is a non-provisional application of, and claims priority to, U.S. Provisional Application Ser. No. 63/344,503 filed on May 20, 2022, the contents of which are hereby incorporated by reference in their entirety.

BACKGROUND

Native software applications are written for a single operating system (OS) and do not automatically run on other operating systems. For example, an application written for ANDROID does not automatically run on WINDOWS. However, there are many advantages to running applications designed for different operating systems simultaneously on the same operating system. Running applications from different operating systems allows interactions between applications that would otherwise be impossible. For example, a user may be able to "drag and drop" content between a WINDOWS application and an ANDROID application if the applications were simultaneously running in the same desktop in a compatible way. Another advantage includes simply increasing the number of available applications that can run on a particular operating system. For example, when migrating a business from an ANDROID platform to a WINDOWS platform, a native WINDOWS version of a legacy ANDROID application may not be available, so it would be desirable to seamlessly and naturally run the legacy ANDROID application on a WINDOWS device.

Virtual machines (VMs) and emulators allow a guest operating system to execute on the same computing device as a host operating system. However, applications in the host operating system and the guest operating system do not typically interoperate as well as two applications designed for the same operating system. For example, even if cut and paste is enabled between native applications and guest applications, drag and drop may not be. Furthermore, applications running on different operating systems operate differently and may appear differently to users. For example, application appearances may be different due to different OS-provided "chrome"—e.g., borders, menus, and other OS-provided user interface (UI) components. Applications may also operate differently due to different UI idioms and conventions. For example, cut and paste is performed with different keyboard combinations on WINDOWS and MACOS. Using an application running in an emulator or virtual machine also degrades the user experience by bringing the guest OS's entire desktop into view when switching to the guest application, unnecessarily occluding part of the host OS's desktop.

It is with respect to these and other considerations that the disclosure made herein is presented.

SUMMARY

The techniques described herein improve user interface consistency when presenting a guest application running on a guest operating system as if it were a native application running on a host operating system. Specifically, window placement limitations imposed by the guest operating system are overcome by coordinating size and location between the guest application and a host proxy application. For example, a guest operating system may not allow the guest application to span multiple displays. To overcome this limitation, an application hosting engine tracks the size and location of the guest application and corresponding host proxy application. When the proxy application is confined to a single display, the size and location of the guest application and corresponding proxy application are synchronized across the desktops of the guest operating system and the host operating system. When the proxy application is moved or resized such that portions of the proxy application are rendered on different displays, the application hosting engine decouples the location synchronization. This allows the guest application to remain contained in a single display on the guest operating system desktop while the proxy application spans multiple displays on the host operating system desktop.

In some configurations, the application hosting engine maintains an offset between the location of the proxy application in the host operating system desktop and the location of the guest application in the guest operating system desktop. When the proxy application is confined to a single display, the application hosting engine positions the guest application at the same location as the proxy application, and so the offset is zero. When the proxy application spans multiple displays the offset is computed as the difference between the screen coordinates of the guest application and the proxy application. This offset may be continually updated as the proxy application is relocated and/or resized.

As user interface commands are received by the proxy application, the application hosting engine translates any screen coordinates included in the commands based on the offset before providing a corresponding command to the guest application. Content generated by the guest application is rendered by the proxy application while the proxy application spans multiple displays—i.e., a portion of the guest application is rendered in one display, while another portion of the guest application is rendered in another display. Allowing content to span multiple displays creates fidelity with the user experience of native applications running within the host operating system.

Mapping different windowing models across operating systems provides the user with a seamless experience, where all apps—regardless of which operating system they were built for—behave the same way. Further, computer programming and other resources are conserved, as application developers need not do anything special in order to provide this seamless experience on a different operating system. Indeed, the application itself may not even be aware that it is running on a different operating system.

In other configurations, a guest application running on a desktop of a guest operating system may not function well if it is resized. In these scenarios, a proxy application may enable resizing without having to resize the corresponding guest application. When a proxy application is resized, the ratio of the size of the proxy application to the size of the corresponding guest application is stored in the application hosting engine. Screen coordinates contained in input commands receive by the proxy application may be adjusted to undo the effect of resizing the proxy application. In this way, input commands target the portion of the guest application that the user intended.

The techniques described separately above—spanning multiple displays while the guest application remains on a single display and resizing the proxy application while the guest application is left at the original size—may also be applied together. In this scenario, the proxy application may span displays and be resized. The coordinates contained in input commands may be adjusted to match the corresponding location in the guest application by first undoing the resizing based on a stored size ratio and then undoing the translation based on the stored offset. However, the operations may also be undone by first undoing the translation and then undoing the resizing.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
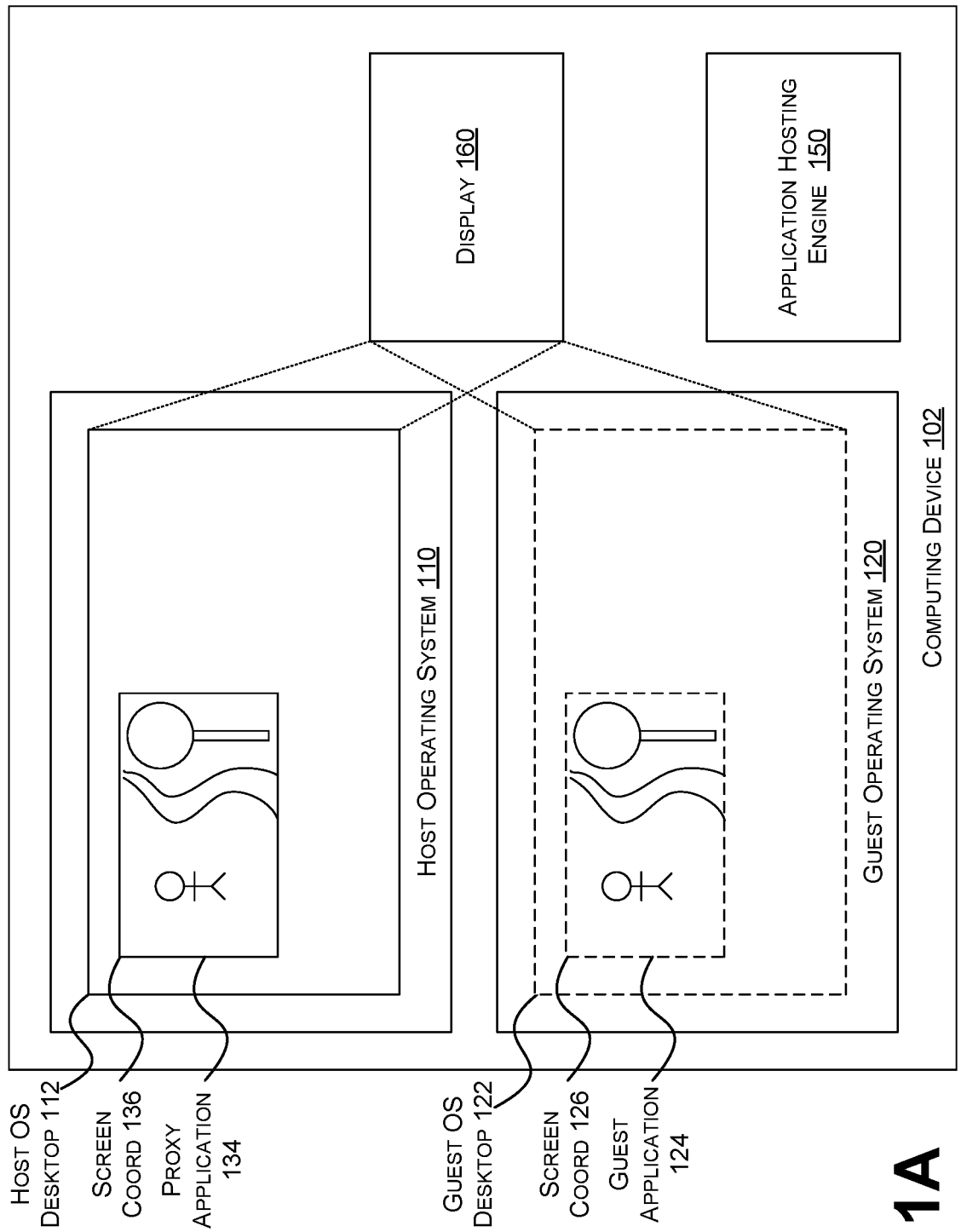
FIG. 1A illustrates an application hosting engine rendering a proxy application that contains content generated by a guest application.

To address the above and other issues, techniques have been developed to present an individual application running on a guest operating system as if it were native to the host operating system. For example, a guest ANDROID-based application may be presented within a WINDOWS desktop, adopting the UI idioms of WINDOWS, interacting with other native WINDOWS applications, and otherwise acting like a native WINDOWS application. To accomplish this, the ANDROID operating system is run within a VM and the guest ANDROID-based application is run in a desktop (user interface) of the ANDROID VM. A proxy application is created within the WINDOWS desktop (user interface) that displays the graphics rendered by the guest application. User input and other interactions with the proxy application are forwarded to the guest application.

Often, the desktops of the guest ANDROID OS and the host WINDOWS OS will have the same size (i.e., resolution) and pixel density. In this scenario, the locations of the proxy application and the guest application will be the same in their respective desktops. For example, if the guest application is located at the screen coordinates (100, 100) in the ANDROID OS desktop, the proxy application will be located at screen coordinates (100, 100) in the WINDOWS OS desktop. In some configurations, an application hosting engine updates the location of the guest application when the location of the proxy application changes, and vice versa. When desktop resolutions are the same and the locations of the proxy application and the guest application are synchronized, UI commands received by the proxy application can be translated into commands targeting the guest application without adjusting screen coordinates. For example, a mouse click event that occurs on the proxy application at screen coordinates (150, 150) can be forwarded directly or translated into an equivalent mouse click command for the guest application at the same screen coordinates (150, 150).

Challenges may be encountered by presenting a guest application as if it were a native application due to incompatible application models of the different operating systems. For example, different operating systems may have different policies about where an application may be located on a desktop that spans multiple displays. For instance, WINDOWS allows an application to span multiple displays. Specifically, a first part of an application window may appear on one display, while a second part of the same application window may appear on a different display. For the purpose of this discussion, the application has a single window, such that the single window spans multiple displays. ANDROID, in contrast, may only allow application windows to be wholly located within a single display of a multiple-display device. Accordingly, the application hosting engine may not allow the proxy application running in the WINDOWS desktop to straddle different displays. Such inconsistencies in application models of different OSes may, among other things, make guest applications look and feel different than host applications, detracting from a seamless user experience.

Accordingly, the techniques disclosed herein enable a host proxy application corresponding to a guest application running in a guest operating system to span multiple displays when the guest operating system only allows applications to be placed completely within a single display. An application hosting engine tracks the size and location of a guest application and corresponding proxy application. Ordinarily, the size and location of the guest application and corresponding proxy application are synchronized across the desktops of the host operating system and the guest operating system. When the proxy application is moved or resized such that portions of the proxy application are rendered on different displays, the application hosting engine decouples the location synchronization. This allows the guest application to remain contained in a single display on the guest operating system desktop while the proxy application spans multiple displays on the host operating system desktop. The application hosting engine may continue to synchronize the size of the proxy application and the guest application. The application hosting engine maintains an offset between the location of the proxy application and the guest application. As user interface commands are received by the proxy application, the application hosting engine translates any screen coordinates included in the commands based on the offset before forwarding a corresponding command to the guest application. Content generated by the guest application is rendered by the proxy application while the proxy application is spanning multiple displays. This creates fidelity with the user experience of native applications running within they host operating system.

Mapping different windowing models across operating systems provides the user with a seamless experience, where all apps—regardless of which operating system they were built for—behave the same way. Further, computer programming and other resources are conserved, as application developers need not do anything special in order to provide this seamless experience on a different operating system. Indeed, the application itself may not even be aware that it is running on a different operating system.

Throughout this document, WINDOWS and ANDROID are used as examples of host and guest operating systems, respectively. However, the disclosure is not so limited, and the present techniques may be applied to any two operating systems that can run concurrently on the same computing device and be controlled by an application hosting engine as described herein.

FIG. 1A illustrates an application hosting engine 150 rendering a proxy application 134 that contains content generated by a guest application 124. Computing device 102 executes host operating system (OS) 110, which displays host operating desktop 112 on a single display 160. Guest operating system 120 is concurrently executing on computing device 102. Guest OS 120 may be running within a hypervisor, virtual machine, emulator, or the like.

Guest OS 120 renders content to guest OS desktop 122, which is also configured to render content to display 160. As such, guest OS desktop 122 and host OS desktop 112 typically have the same dimensions, resolution, and other properties. Guest application 124 is running on guest OS 120. Guest application 124 renders content that would ordinarily be displayed by guest OS 120 on guest OS desktop 122. However, in order to create the impression that guest application 124 is a native application running on host OS 110 and allow increased functionality between guest application 124 and other native applications running on host OS 110, application hosting engine 150 renders the content generated by guest application 124 in proxy application 134. Proxy application 134 appears on host OS desktop 112 and operates and appears as a true native application of host OS 110. In some configurations, application hosting engine 150 only renders content generated by guest OS 120 that is associated with a guest application that is proxied in host OS 110. That guest OS 120 does not actually render to display 160 is indicated by dashed lines of guest OS desktop 122 and guest application 124. In some configurations, guest OS 120 renders content to a pseudo display device that does not actually render content to a screen. In some configurations, application hosting engine 150 provides guest application 124 with a graphics buffer into which content is rendered. Proxy application 134 may then use this buffer when rendering content to host OS desktop 112.

Since guest OS 120 and host OS 110 are configured to use the same display 160, screen coordinates 126 and 136 are the same. As proxy application 134 is moved around host OS desktop 112, application hosting engine 150 will move guest application 124 to the corresponding location within guest OS desktop 122. Similarly, in some embodiments, as proxy application 134 is resized within host desktop 112, application hosting engine 150 will resize guest application 124 to the same width and height. In other embodiments, application hosting engine 150 may keep guest application 124 a constant size while allowing proxy application 134 to be resized. Updating the size and location of guest application 124 in this way is referred to herein as synchronizing size and location of proxy application 134 and guest application 124.

Figure 1B:
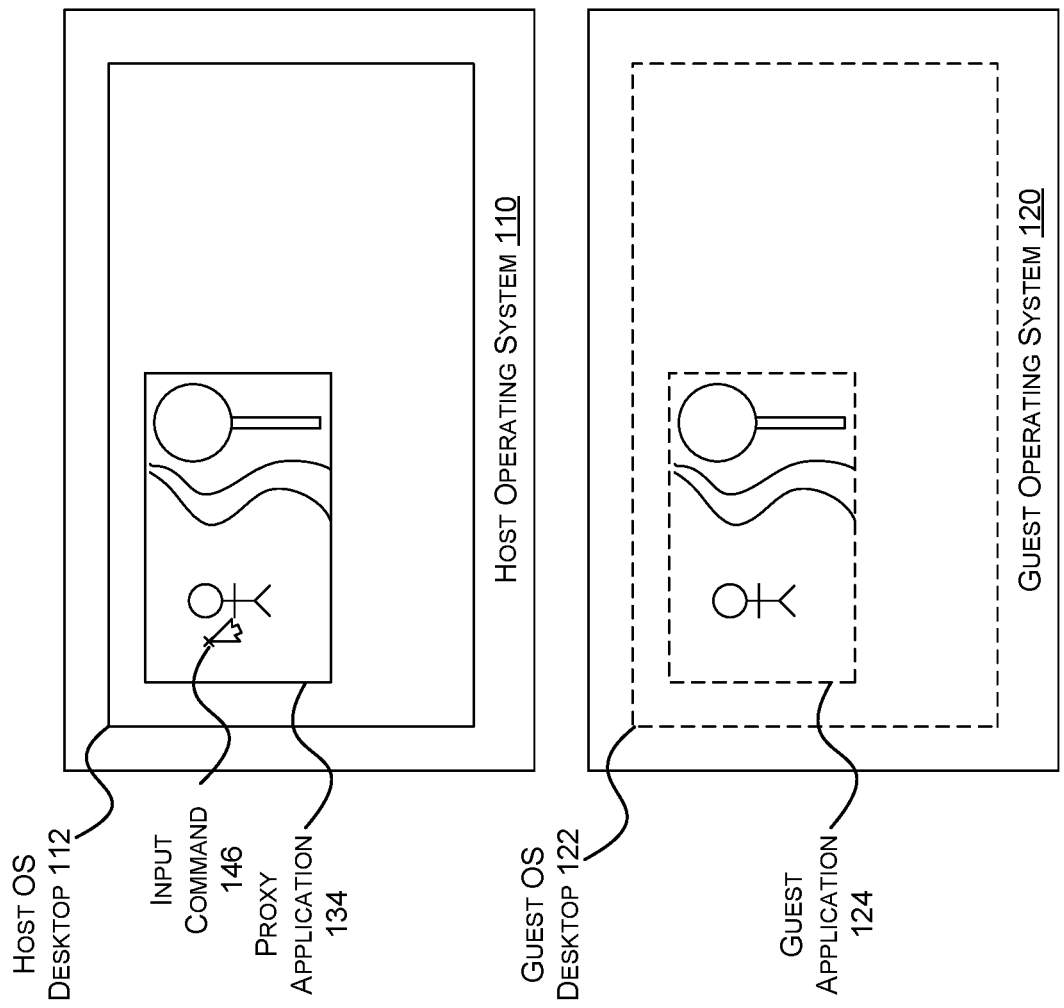
FIG. 1B illustrates an input command received by the proxy application.

FIG. 1B illustrates an input command 146 received by the proxy application 134. Input command 146 may be a mouse click, keyboard input, touch input, voice command, automation command, the invocation of an operating system user interface application programming interface (API), or any other technique for controlling the proxy application 134. Input command 146 may be the beginning of a sequence of input commands, such as a double click, drag and drop, hover, or other user interface idiom.

Figure 1C:
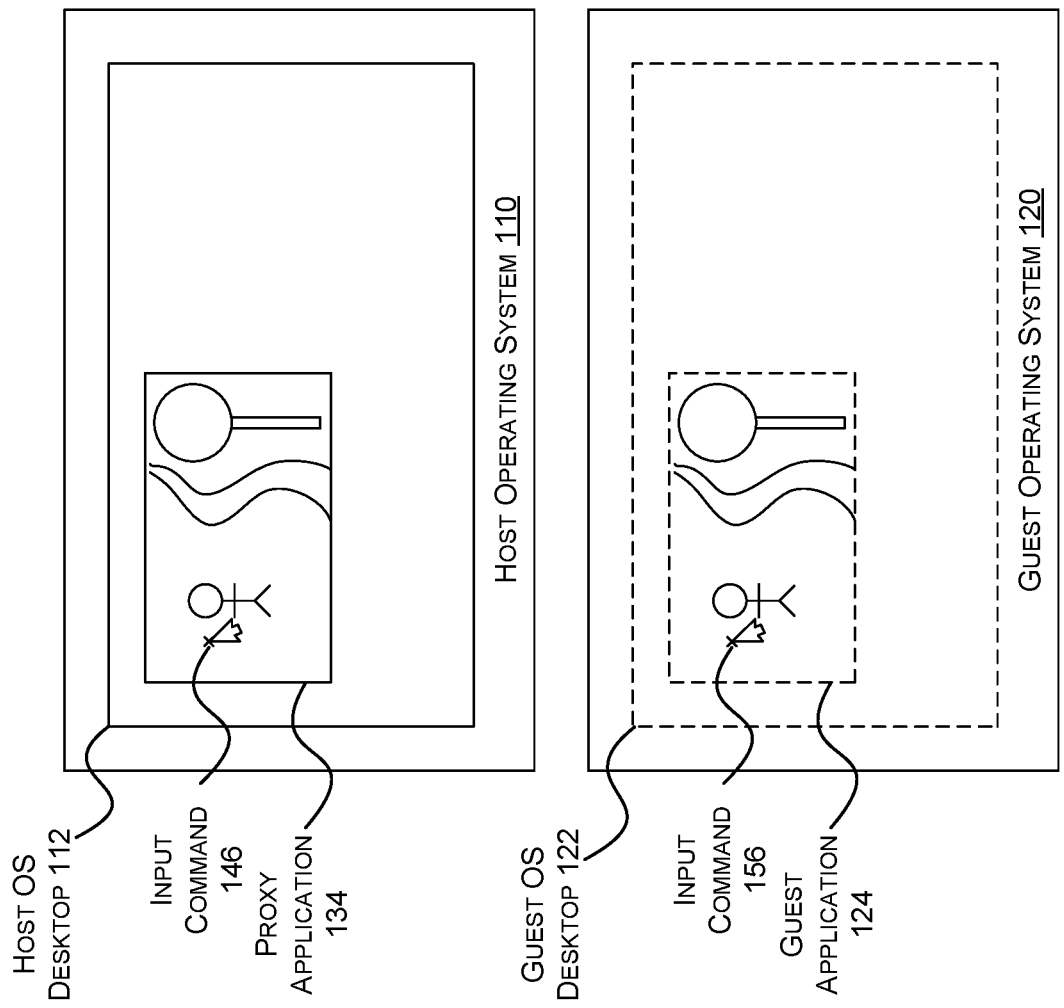
FIG. 1C illustrates the input command of FIG. 1B as provided to the guest application by the application hosting engine.

FIG. 1C illustrates the input command 146 as provided to the guest application 124 by the application hosting engine 150. Application hosting engine 150 provides input command 146 to guest application 124 as input command 156. Input command 156 may be a direct copy of input command 146 or a translation to one or more corresponding input commands recognized by applications running on guest OS 120. For example, if proxy application 134 receives a mouse click event at coordinates (200, 250), application hosting engine 150 may create a mouse click event with coordinates (200, 250) but that is formatted for applications running on guest OS 120 and forward it to guest application 124. Alternatively, application hosting engine may invoke an automation API, OS API, or an application-specific API to cause guest application 124 to perform a function equivalent to the function that input command 146 is expected to perform.

Figure 2A:
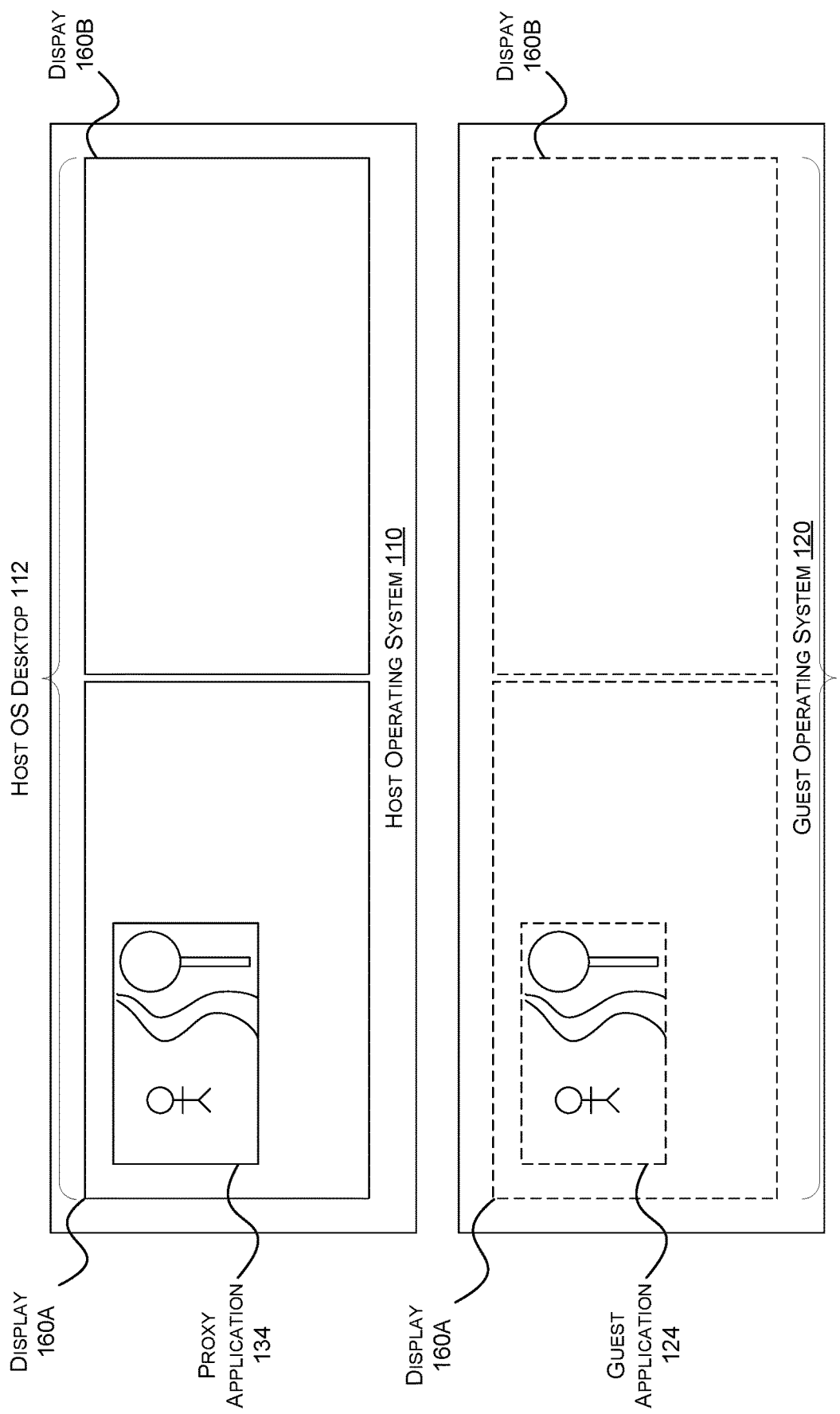
FIG. 2A illustrates a host operating system and a guest operating system running on a system with two display devices.

FIG. 2A illustrates a host operating system 110 and a guest operating system 120 running on a computing device with two display devices 160. As illustrated, there are two display devices 160A and 160B, and both the host OS 110 and guest OS 120 are configured to render to each display device. Host OS desktop 112 and guest OS desktop 122 span both display devices 160. Guest application 124 and corresponding proxy application 134 are located in the leftmost display 160A of guest OS desktop 122 and host OS desktop 112, respectively. While two display devices are depicted, any number of display devices are similarly contemplated.

In some configurations, the resolutions of each display 160 are stored in application hosting engine 150. The scaling factor of each display 160 may also be stored in application hosting engine 150—i.e. the number of dots per inch displayed by each display. In some configurations, the resolution of each display 160 may be used to calculate the correct position for guest application 124—i.e. to ensure that guest application 124 remains completely within the supported resolution of one of displays 160.

In some configurations, the resolution and scaling of displays 160 is synchronized between the host OS 110 and the guest OS 120. This ensures that any changes made by a user to one of the OSes are reflected in the other.

Figure 2B:
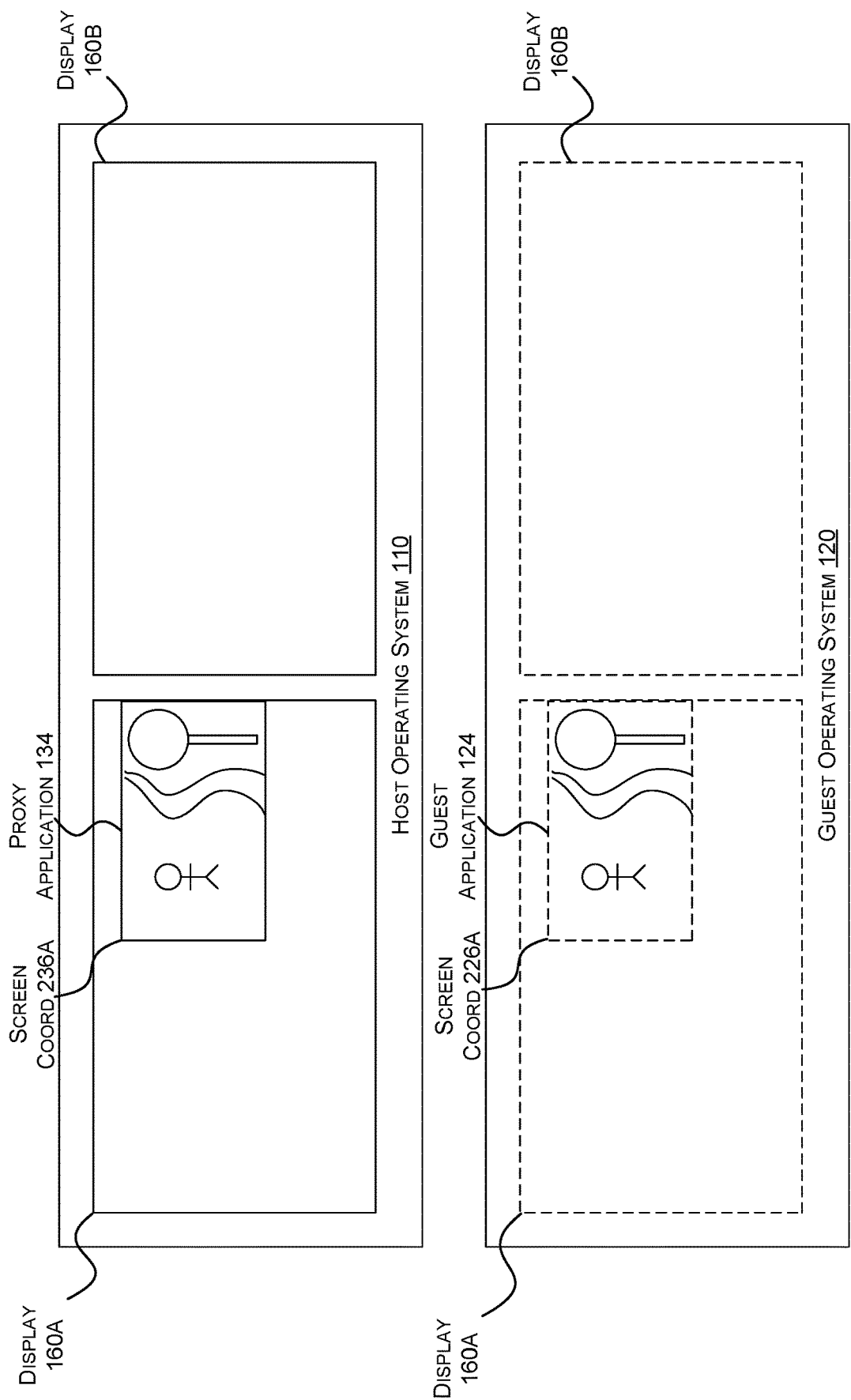
FIG. 2B illustrates the host and guest desktops after the proxy application is moved across a first display and the application hosting engine maintains location synchronicity of the guest application.

FIG. 2B illustrates host desktop 112 and guest desktop 122 after the proxy application has been moved across display 160A. Application hosting engine 150 has maintained location synchronicity of guest application 124, keeping the locations of guest application 124 and proxy application 134 in sync during the move. Proxy application 134 may have been moved by a click and drag operation, programmatically, or in any other manner. As illustrated, guest application 124 and proxy application 134 abut the right edge of display 160A. In this configuration, screen coordinates 226A within guest desktop 122 and screen coordinates 236A within host desktop 112 are the same. As such, size and location synchronicity are still enabled, and application hosting engine 150 is able to provide input commands as discussed above in conjunction with FIG. 1B, i.e., without translating any screen coordinates included in the command.

Figure 2C:
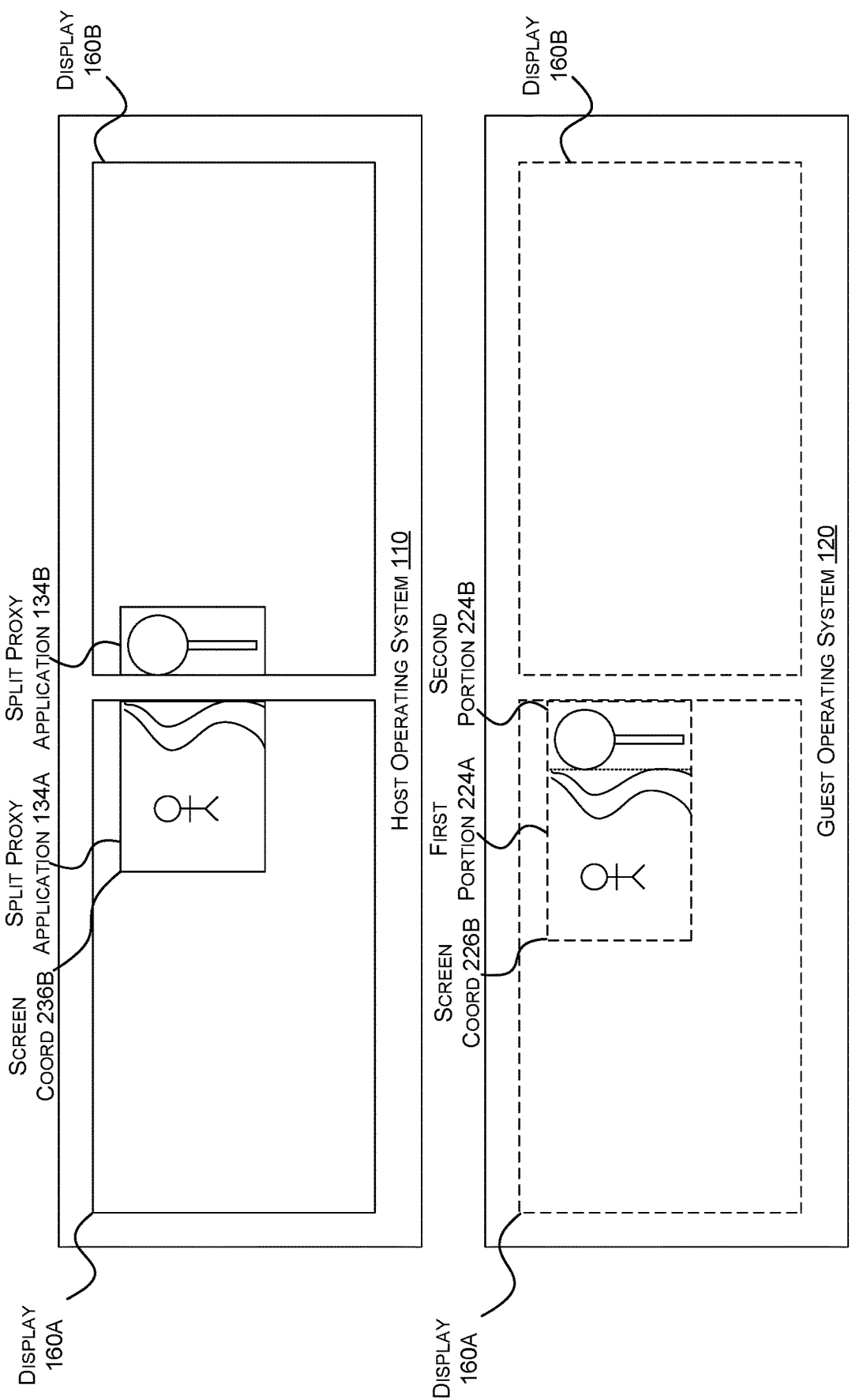
FIG. 2C illustrates the host and guest desktops after the proxy application is moved or resized so as to span multiple displays, causing the application hosting engine to enter a split-screen mode, keeping the guest application contained within a single display.

FIG. 2C illustrates the host and guest desktops after the proxy application is moved or resized so as to span multiple displays, causing the application hosting engine to enter a split-screen mode. While in a split-screen mode, synchronicity of location is no longer maintained, although synchronicity of size may still be maintained. As illustrated, split proxy application 134A is the portion of proxy application 134 rendered in display 160A, while split proxy application 134B is the portion of proxy application 134 rendered in display 160B. Split proxy application 134A displays the content contained in first portion 224A of guest application 124, while split proxy application 134B displays the content contained in second portion 224B of guest application 124. The dividing line between first portion 224A and second portion 224B indicates where the content of guest application 124 is split across displays, but is only illustrative and does not actually appear on either desktop. Guest application 124 remains completely in display 160A— although in other embodiments it could be moved to be completely located in display 160B.

When synchronicity of location is not being maintained— i.e., so long as proxy application 134 spans multiple displays—application hosting engine 150 will not change the location of guest application 124 if the location of proxy application 134 changes. Instead, application hosting engine 150 maintains an offset from screen coordinate 226B to screen coordinate 236B. Application hosting engine 150 will use this offset to adjust screen coordinate parameters of input commands forwarded to guest application 124.

While synchronicity of size is being maintained, application hosting engine 150 may adjust the size of guest application 124 as the size of proxy application 134 changes. In addition, application hosting engine 150 will adjust the location 226B of guest application 124 so that it remains located completely within a single display device. For example, a user may increase the size of proxy application 134, expanding it further into display 160B. Application hosting engine 150 may respond by changing the size of guest application 124 to match, while also extending the location of guest application 124 toward the left to maintain a location completely within display 160A.

Figure 2D:
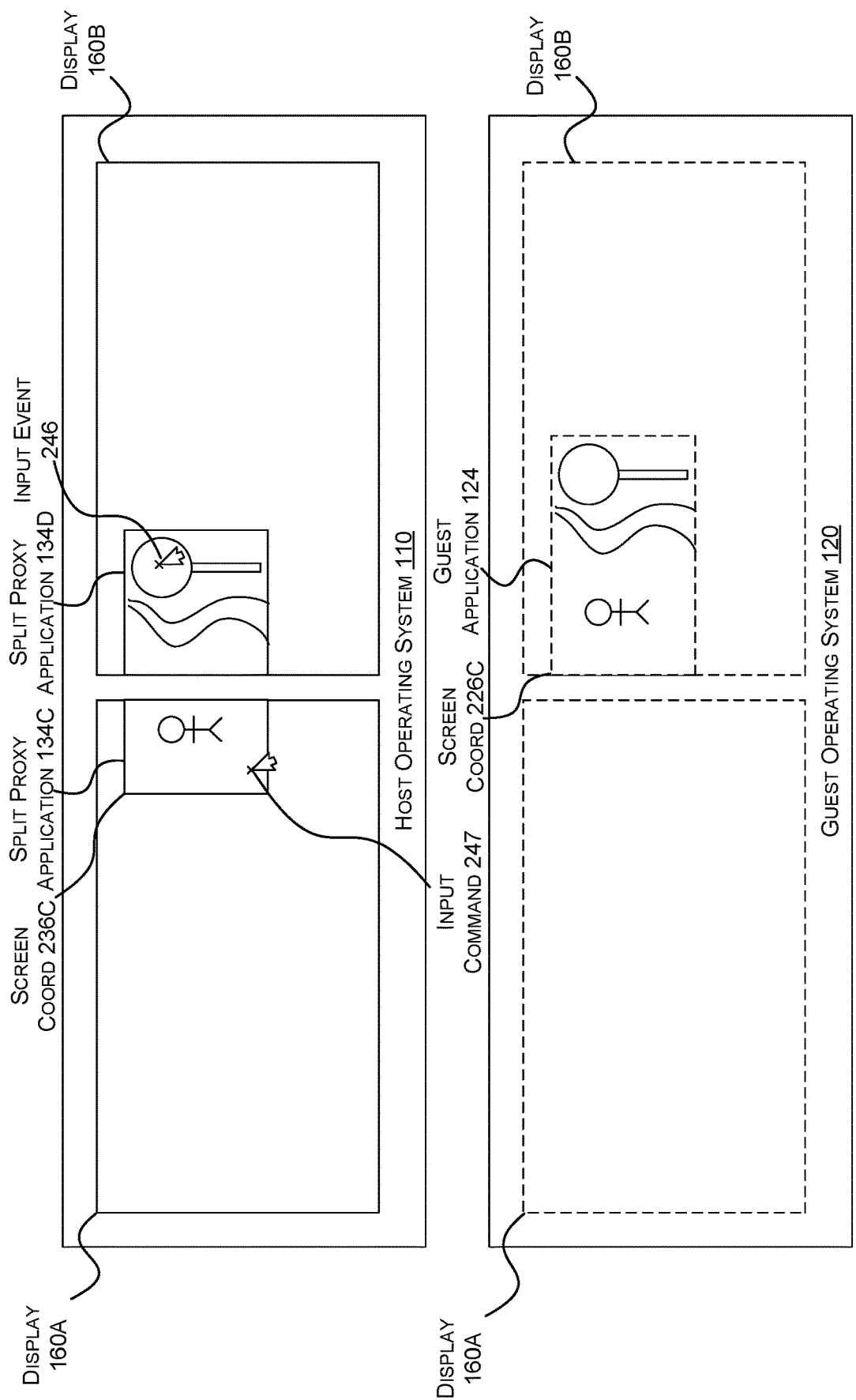
FIG. 2D illustrates the host and guest desktops after the proxy application is moved or resized such that more than half of the application is located on the rightmost display, causing the application hosting engine to move the guest application completely to the rightmost display.

FIG. 2D illustrates the host and guest desktops after the proxy application 134 is moved or resized such that more than half of the proxy application 134 is located on the rightmost display 160B, causing the application hosting engine 150 to move the guest application 124 completely to the rightmost display 160B. Specifically, split proxy application 134C, which is located in display 160A, is smaller than split proxy application 134D, which is located in display 160B. The new locations of proxy application 134 and guest application 124 are represented by screen coordinates 236C and 226C, respectively. Other thresholds for determining when to move guest application 124 from one display 160 to the other are similarly contemplated. It is also contemplated that guest application 124 may not be moved while application hosting engine 150 maintains location synchronicity, regardless of what percentage is rendered in each display 160.

FIG. 2D also illustrates input commands 246 and 247, which are located at locations within proxy application 134. In some configurations, input command 246 includes coordinates that are relative to the window displaying proxy application 134. In other scenarios, input command 246 includes coordinates that are relative to host OS desktop 112. When invoking a corresponding input command on guest application 124, application hosting engine 150 translates application coordinates to screen coordinates and screen coordinates to application coordinates according to the expectations of guest application 124.

Figure 2E:
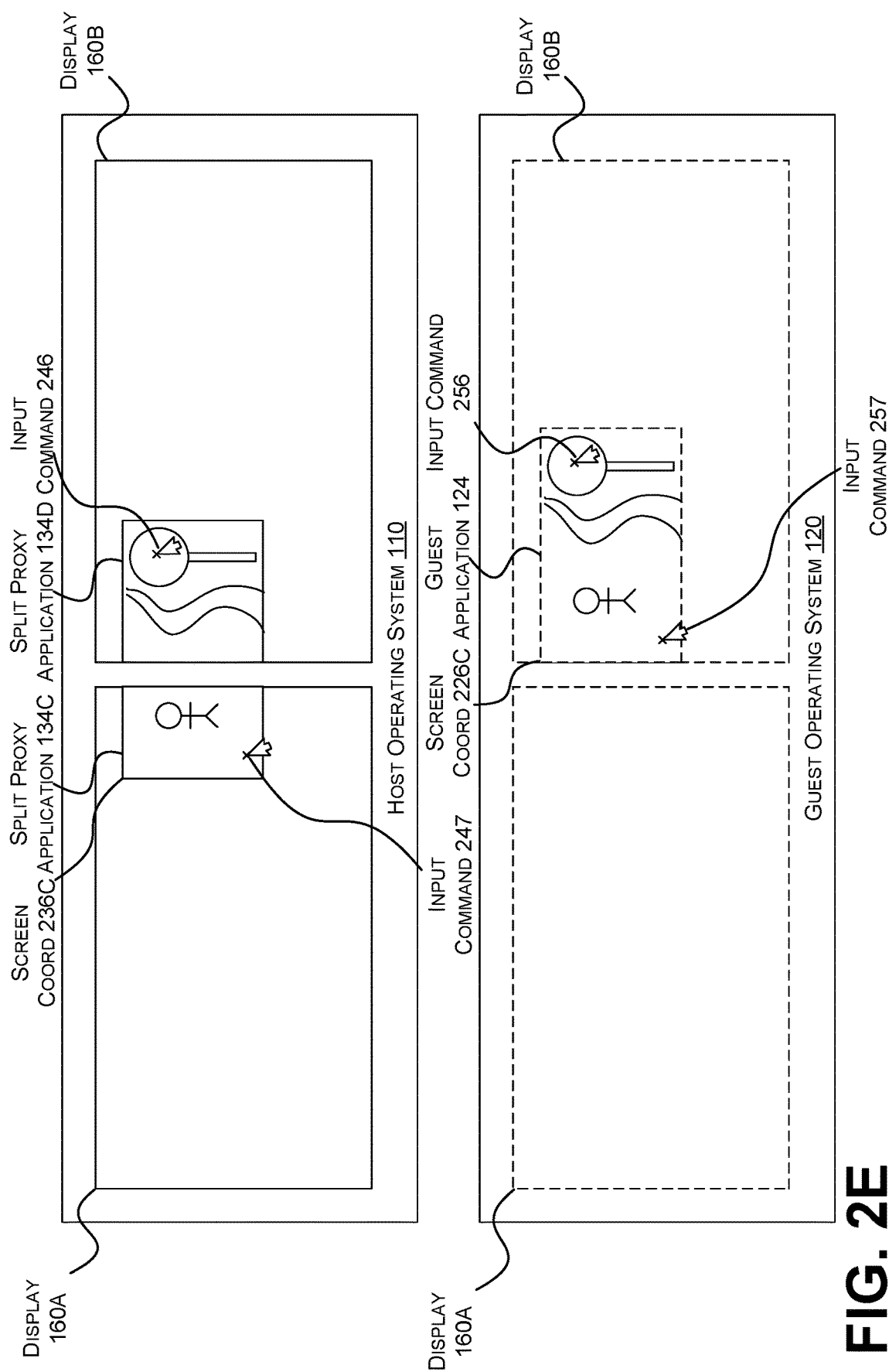
FIG. 2E illustrates an input command received by the proxy application and a corresponding input command sent to the guest application.

FIG. 2E illustrates input commands 246 and 247 received by proxy application 134 and corresponding input commands 256 and 257 provided to guest application 124. Application hosting engine 150 has adjusted the coordinates contained in input commands 246 and 247 to reflect the different locations of guest application 124 and proxy application 134. Specifically, the current offset of proxy application 134 relative to guest application 124 has been added to the screen coordinates of input commands 247 and 247 when generating input commands 256 and 257, respectively. As illustrated, the offset is computed by subtracting screen coordinate 236C from screen coordinate 226C. Input commands 246 and 247 are two distinct commands. Input command 247 illustrates that an input command may be translated to a coordinate on a different display when location synchronicity is not being maintained.

Figure 2F:
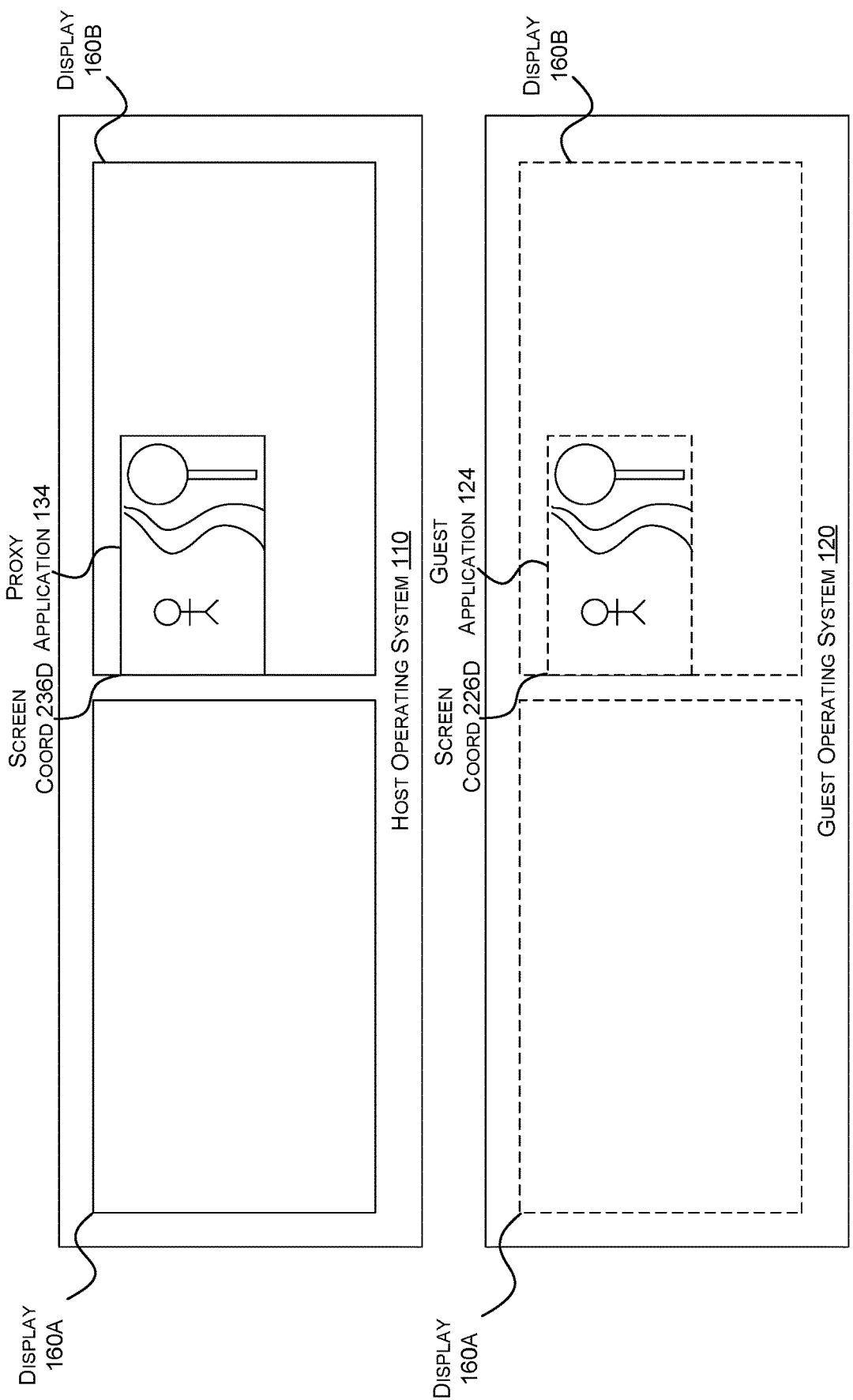
FIG. 2F illustrates the host and guest desktops after the proxy application is moved or resized to be completely located on the rightmost display, causing the application hosting engine to disengage split-screen mode and resume synchronous forwarding of commands to the guest application.

FIG. 2F illustrates the host and guest desktops after the proxy application is moved or resized to be completely located on the rightmost display, causing the application hosting engine to disengage split-screen mode and resume synchronous forwarding of commands to the guest application. At this point, screen coordinates 226D and 236D are the same.

Figure 2G:
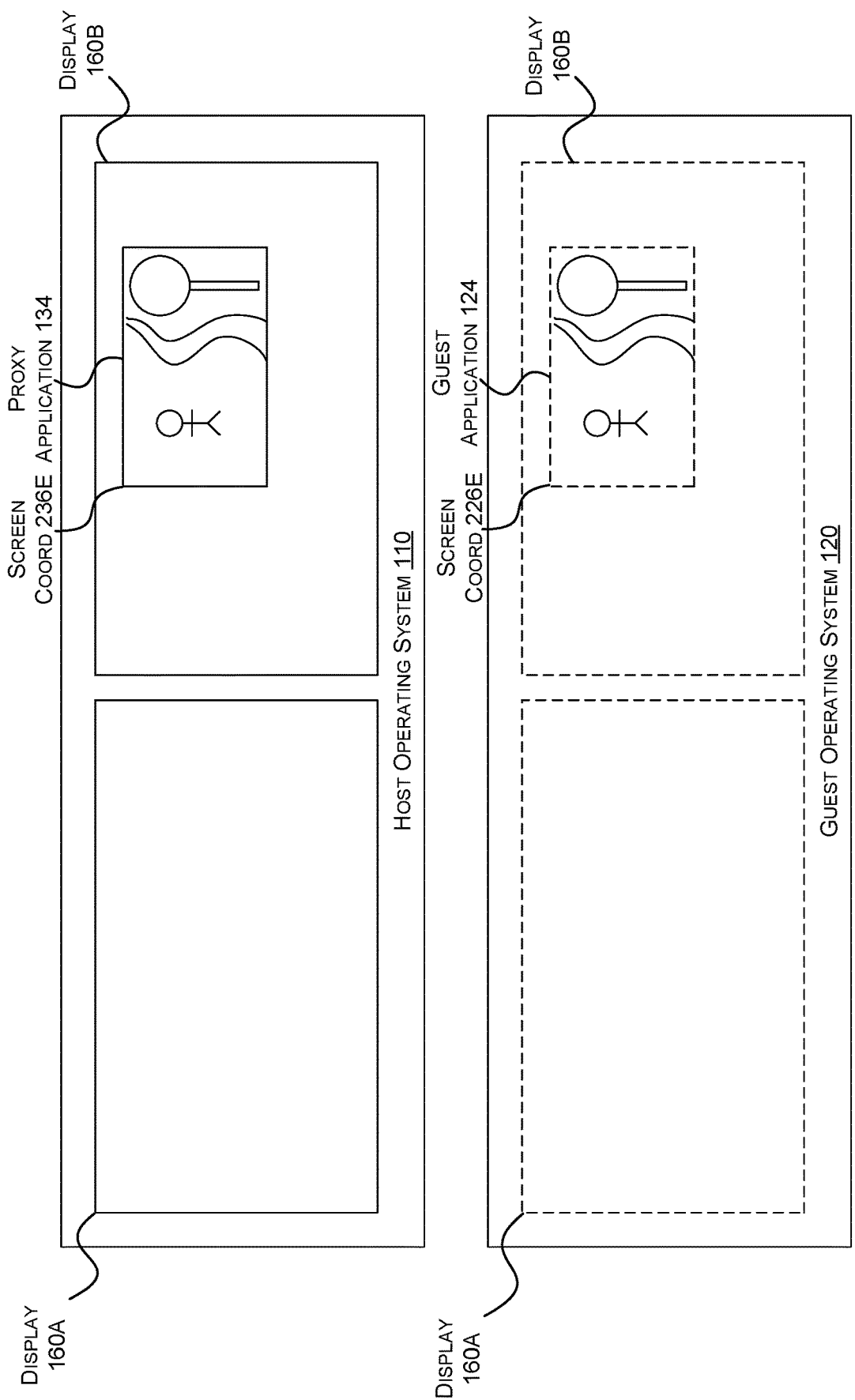
FIG. 2G illustrates the host and guest desktops after the proxy application is moved within the rightmost display, causing the application hosting engine to update the location of the guest application to the same location as the proxy application.

FIG. 2G illustrates the host and guest desktops after the proxy application is moved within the rightmost display 160B, causing the application hosting engine to update the location of the guest application 226E to the same location 236E as the proxy application.

Figure 3:
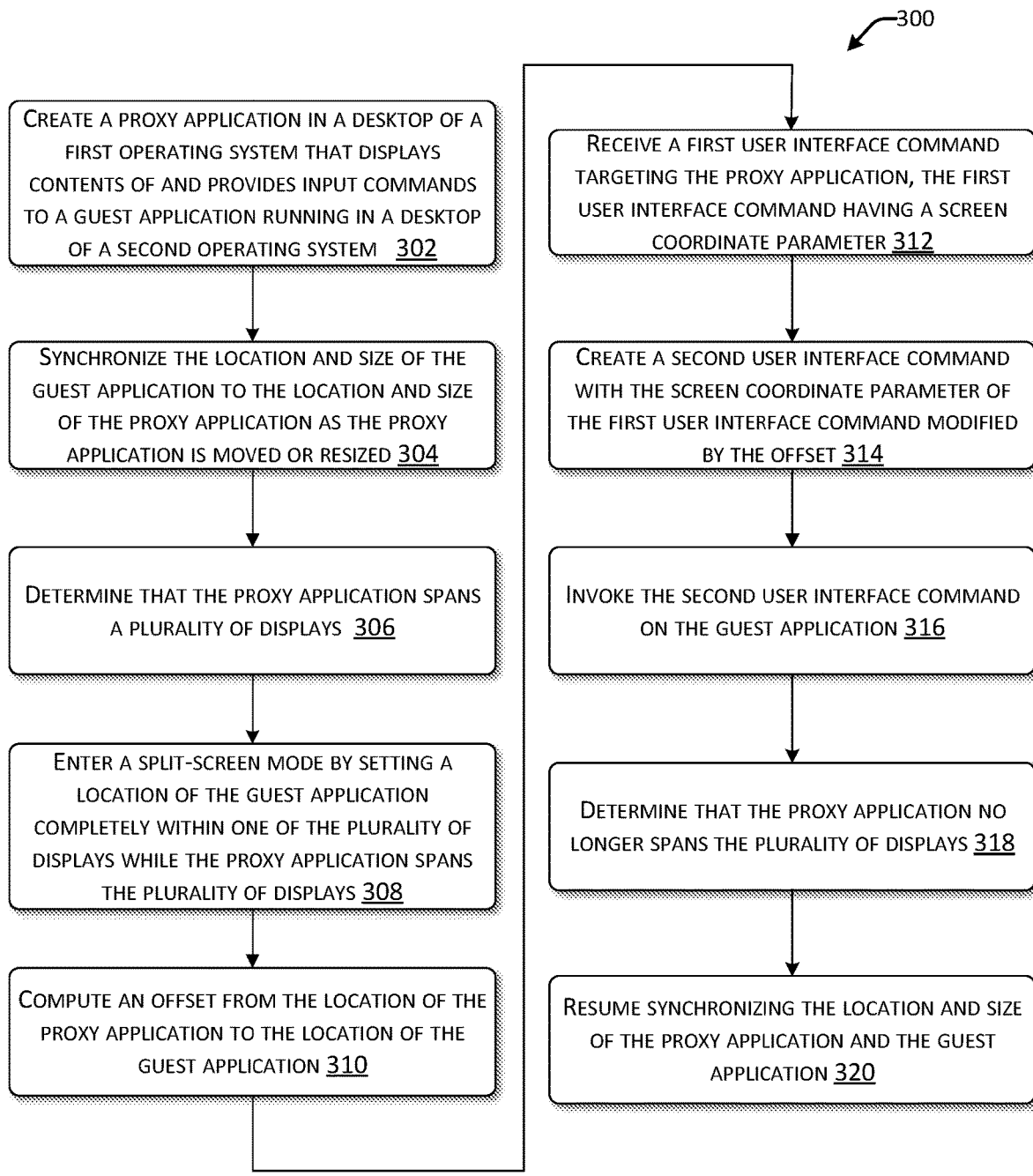
FIG. 3 is a flow diagram of an example method for mapping incompatible windowing topographies across operating systems.

Turning now to FIG. 3, aspects of a routine for mapping incompatible windowing topographies across operating systems is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 3, routine 300 begins at operation 302 where the system creates a proxy application 134 in a desktop 112 of a first operating system 110. The proxy application 134 displays content rendered by guest application 124 running in guest OS 120. Input commands received by proxy application 134 are also provided to guest application 124, enabling a user of desktop 112 to appear to manipulate guest application 124 as if it were native to host OS 110.

Next at operation 304, the system synchronizes the location 226 and size of guest application 124 to the location 236 and size of proxy application 134 as proxy application 134 is moved or resized within desktop 112 of host OS 110.

Next at operation 306, a determination is made that the proxy application 134 spans a plurality of displays 160. This could be the result of a user moving proxy application 134, resizing proxy application 134, or automation moving or resizing proxy application 134.

Next at operation 308, application hosting engine 150 enters a split-screen mode for guest application 124. Other guest applications being proxied will be managed separately, and may or may not also be in a split-screen mode based on whether they individually span multiple displays. Once in the split-screen mode, application hosting engine 150 sets the location of guest application 124 to remain completely in one of displays 160. This satisfies the programming model of guest operating system 120.

Proceeding to operation 310, the offset of proxy application 134 from guest application 124 is computed. For example, the difference between coordinates 236 and 226 are computed. This offset may be updated whenever proxy application 134 is moved or resized and application hosting engine 150 is still in split-screen mode.

Proceeding to operation 312, a user interface command 246 is received by proxy application 134.

Proceeding to operation 314, application hosting engine 150 creates a corresponding user interface command 256 that targets guest application 124. User interface command 256 will adhere to the requirements of guest operation system 120. Application hosting engine 150 will adjust any screen coordinate parameters by the offset maintained between the locations of proxy application 134 and guest application 124.

Proceeding to operation 316, the user interface command 256 is provided to the guest application 124.

Proceeding to operation 318, application hosting engine 150 determines that proxy application 134 is no longer spanning the plurality of displays 160.

Proceeding to operation 320, application hosting engine 150 resumes synchronizing size and location of the guest application 124 based on the size and location of proxy application 134.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 300 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 300 may be also implemented in many other ways. For example, the routine 300 may be implemented, at least in part, by a processor of another remote computer or a local circuit. In addition, one or more of the operations of the routine 300 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 4:
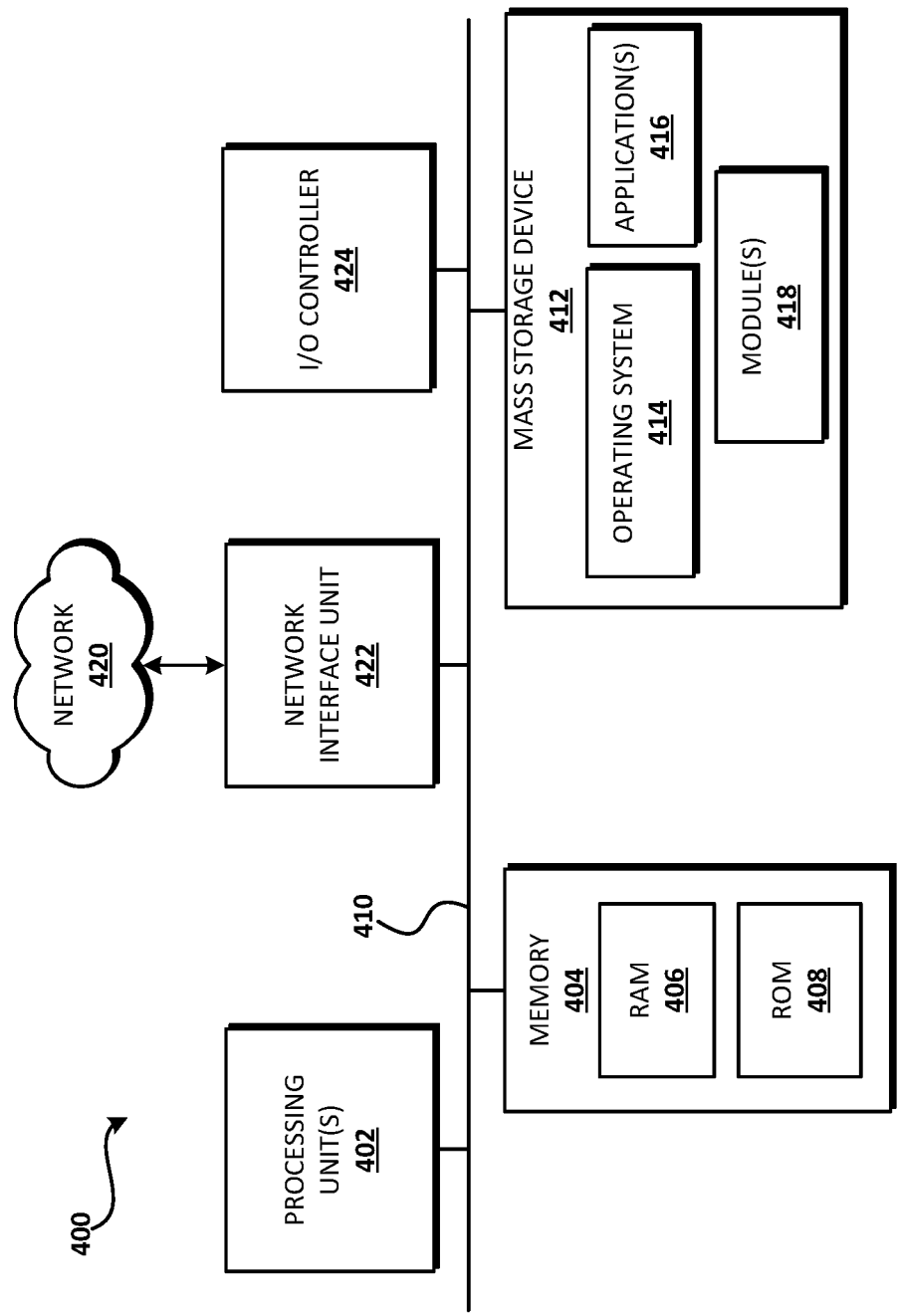
FIG. 4 is a computer architecture diagram illustrating an illustrative computer hardware and software architecture for a computing system capable of implementing aspects of the techniques and technologies presented herein.

FIG. 4 shows additional details of an example computer architecture 400 for a device, such as a computer or a server configured as part of the systems described herein, capable of executing computer instructions (e.g., a module or a program component described herein). The computer architecture 400 illustrated in FIG. 4 includes processing unit(s) 402, a system memory 404, including a random-access memory 406 ("RAM") and a read-only memory ("ROM") 408, and a system bus 410 that couples the memory 404 to the processing unit(s) 402.

Processing unit(s), such as processing unit(s) 402, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 400, such as during startup, is stored in the ROM 408. The computer architecture 400 further includes a mass storage device 412 for storing an operating system 414, application(s) 416, modules 418, and other data described herein.

The mass storage device 412 is connected to processing unit(s) 402 through a mass storage controller connected to the bus 410. The mass storage device 412 and its associated computer-readable media provide non-volatile storage for the computer architecture 400. Although the description of computer-readable media contained herein refers to a mass storage device, it should be appreciated by those skilled in the art that computer-readable media can be any available computer-readable storage media or communication media that can be accessed by the computer architecture 400.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 400 may operate in a networked environment using logical connections to remote computers through the network 420. The computer architecture 400 may connect to the network 420 through a network interface unit 422 connected to the bus 410. The computer architecture 400 also may include an input/output controller 424 for receiving and processing input from a number of other devices, including a keyboard, mouse, touch, or electronic stylus or pen. Similarly, the input/output controller 424 may provide output to a display screen, a printer, or other type of output device.

It should be appreciated that the software components described herein may, when loaded into the processing unit(s) 402 and executed, transform the processing unit(s) 402 and the overall computer architecture 400 from a general-purpose computing system into a special-purpose computing system customized to facilitate the functionality presented herein. The processing unit(s) 402 may be constructed from any number of transistors or other discrete circuit elements, which may individually or collectively assume any number of states. More specifically, the processing unit(s) 402 may operate as a finite-state machine, in response to executable instructions contained within the software modules disclosed herein. These computer-executable instructions may transform the processing unit(s) 402 by specifying how the processing unit(s) 402 transition between states, thereby transforming the transistors or other discrete hardware elements constituting the processing unit(s) 402.

Figure 5:
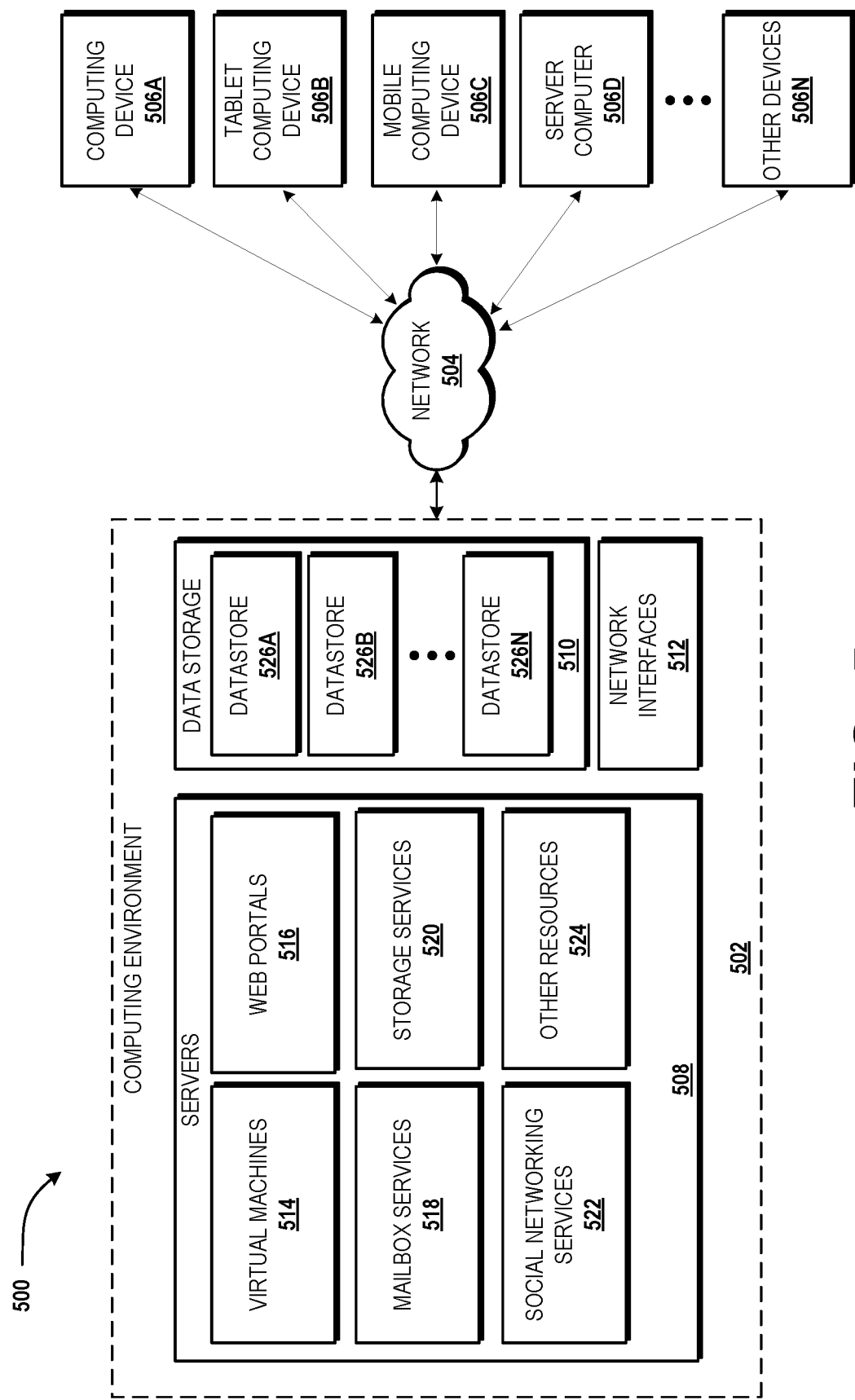
FIG. 5 is a diagram illustrating a distributed computing environment capable of implementing aspects of the techniques and technologies presented herein.

FIG. 5 depicts an illustrative distributed computing environment 500 capable of executing the software components described herein. Thus, the distributed computing environment 500 illustrated in FIG. 5 can be utilized to execute any aspects of the software components presented herein. For example, the distributed computing environment 500 can be utilized to execute aspects of the software components described herein.

Accordingly, the distributed computing environment 500 can include a computing environment 502 operating on, in communication with, or as part of the network 504. The network 504 can include various access networks. One or more client devices 506A-506N (hereinafter referred to collectively and/or generically as "clients 506" and also referred to herein as computing devices 506) can communicate with the computing environment 502 via the network 504. In one illustrated configuration, the clients 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of clients 506 can communicate with the computing environment 502.

In various examples, the computing environment 502 includes servers 508, data storage 510, and one or more network interfaces 512. The servers 508 can host various services, virtual machines, portals, and/or other resources. In the illustrated configuration, the servers 508 host virtual machines 514, Web portals 516, mailbox services 518, storage services 520, and/or, social networking services 522.

As shown in FIG. 5 the servers 508 also can host other services, applications, portals, and/or other resources ("other resources") 524.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more servers configured to host data for the computing environment 502. The data storage 510 can include, host, or provide one or more real or virtual datastores 526A-526N (hereinafter referred to collectively and/or generically as "datastores 526"). The datastores 526 are configured to host data used or created by the servers 508 and/or other data. That is, the datastores 526 also can host or store web page documents, word documents, presentation documents, data structures, algorithms for execution by a recommendation engine, and/or other data utilized by any application program. Aspects of the datastores 526 may be associated with a service for storing files.

The computing environment 502 can communicate with, or be accessed by, the network interfaces 512. The network interfaces 512 can include various types of network hardware and software for supporting communications between two or more computing devices including, but not limited to, the computing devices and the servers. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 500 to utilize the functionality described herein for providing the techniques disclosed herein, among other aspects.

The present disclosure is supplemented by the following example clauses.

Example 1: A method comprising: creating a proxy application (134) on a desktop (112) of a host operating system (110), wherein the proxy application (134) displays content of and provides input commands to a guest application (124) running in a desktop (122) of a guest operating system (120); synchronizing a location (226) of the guest application (124) on the desktop (122) of the guest operating system (120) with a location (236) of the proxy application (134) on the desktop (112) of the host operating system (110); determining that the proxy application (134) has begun spanning a plurality of displays (160); in response to the determination that the proxy application (134) has begun spanning the plurality of displays (160): entering a split-screen mode in which the location (226) of the guest application (124) is no longer synchronized with the location (236) of the proxy application (134); setting a location of the guest application (124) so that the guest application (124) remains within one of the plurality of displays (160); and while in the split-screen mode, rendering a first portion (224A) of the guest application (124) in a first display (160A) of the plurality of displays (160) and rendering a second portion (224B) of the guest application (124) in a second display (160B) of the plurality of displays (160).

Example 2: The method of Example 1, wherein the response to the determination that the proxy application has begun spanning the plurality of displays further includes: determining an offset from the location of the guest application to the location of the proxy application; receiving a first user interface command targeting the proxy application; generating a second user interface command targeting the guest application based on the first user interface command, wherein a screen coordinate from the first user interface command is translated based on the offset and included in the second user interface command; and invoking the second user interface command on the guest application.

Example 3: The method of Example 1, further including: while in the split-screen mode, determining that a size of the proxy application has been increased in at least one dimension; determining that resizing the guest application to the size of the proxy application would cause the guest application to no longer be displayed completely on an individual display of the plurality displays; relocating the guest application so that resizing the guest application to the size of the proxy application allows the guest application to be displayed completely on an individual display of the plurality of displays; and resizing the guest application to the size.

Example 4: The method of Example 1, wherein synchronizing the location of the guest application comprises receiving an updated location of the proxy application and changing the location of the guest application to the updated location of the proxy application.

Example 5: The method of Example 1, further comprising: while in the split-screen mode, receiving an indication that the proxy application was moved to a new location; determining that, at the new location, the proxy application spans a plurality of displays; and leaving the location of the guest application unchanged.

Example 6: The method of Example 1, further comprising: while in the split-screen mode, receiving an indication that the proxy application was moved to a new location; determining that, at the new location, the proxy application does not span two of the plurality of displays; exiting the split-screen mode; and setting the location of the guest application to the new location of the proxy application.

Example 7: The method of Example 1, further comprising: synchronizing a size of the guest application with a size of the proxy application, wherein the proxy application has begun spanning the plurality of displays due to a change in location, a change in size, or a change in location and a change in size of the proxy application.

Example 8: The method of Example 1, wherein a size of the guest application is fixed, further comprising: determining an offset from the location of the guest application to the location of the proxy application; receiving a resize indication that a size of the proxy application has changed; determining a size ratio between the guest application and the proxy application; receiving a first user interface command targeting the proxy application; generating a second user interface command targeting the guest application based on the first user interface command, wherein a screen coordinate from the first user interface command is translated based on the offset and scaled based on the size ratio before being included in the second user interface command; and invoking the second user interface command on the guest application.

Example 9: A computer-readable storage medium comprising instructions that, when executed by a processor, cause the processor to: create a proxy application (134) on a desktop (112) of a host operating system (110), wherein the proxy application (134) displays content of and provides input commands to a guest application (124) running in a desktop (122) of a guest operating system (120); synchronize a location (226) of the guest application (124) on the desktop (122) of the guest operating system (120) with a location (236) of the proxy application (134) on the desktop (112) of the host operating system (110); determine that the proxy application (134) has begun spanning a plurality of displays (160); in response to the determination that the proxy application (134) has begun spanning the plurality of displays (160): enter a split-screen mode in which the location (226) of the guest application (124) is no longer synchronized with the location (236) of the proxy application (134); set a location of the guest application (124) so that the guest application (124) remains within one of the plurality of displays (160); and while in the split-screen mode, render a first portion (224A) of the guest application (124) in a first display (160A) of the plurality of displays (160) and rendering a second portion (224B) of the guest application (124) in a second display (160B) of the plurality of displays (160).

Example 10: The computer-readable storage medium of Example 9, wherein the location of the guest application is synchronized with the location of the proxy application as the proxy application is moved around the desktop of the host operating system.

Example 11: The computer-readable storage medium of Example 9, wherein a size of the guest application is fixed, further comprising: receiving a resize indication that a size of the proxy application has changed; determining a size ratio between the guest application and the proxy application; and scaling content generated by the guest application for display in the proxy application based on the size ratio.

Example 12: The computer-readable storage medium of Example 9, the guest operating system limits the guest application to a single display of the plurality of displays.

Example 13: The computer-readable storage medium of Example 9, wherein the response to the determination that the proxy application has begun spanning the plurality of displays further includes: determining an offset from the location of the guest application to the location of the proxy application; receiving a first user interface command targeting the proxy application; generating a second user interface command targeting the guest application based on the first user interface command, wherein a screen coordinate from the first user interface command is translated based on the offset and included in the second user interface command; and invoking the second user interface command on the guest application.

Example 14: The computer-readable storage medium of Example 13, wherein the instructions further cause the processor to: update the offset as the location of the proxy application changes and while the proxy application spans two or more of the plurality of displays.

Example 15: A computing device comprising: one or more processors; a memory in communication with the one or more processors, the memory having computer-readable instructions stored thereupon which, when executed by the one or more processors, cause the computing device to: create a proxy application (134) on a desktop (112) of a host operating system (110), wherein the proxy application (134) displays content of and provides input commands to a guest application (124) running in a desktop (122) of a guest operating system (120); synchronize a location (226) of the guest application (124) on the desktop (122) of the guest operating system (120) with a location (236) of the proxy application (134) on the desktop (112) of the host operating system (110); determine that the proxy application (134) has begun spanning a plurality of displays (160); in response to the determination that the proxy application (134) has begun spanning the plurality of displays (160): enter a split-screen mode in which the location (226) of the guest application (124) is no longer synchronized with the location (236) of the proxy application (134); set a location of the guest application (124) so that the guest application (124) remains within one of the plurality of displays (160); and while in the split-screen mode, render a first portion (224A) of the guest application (124) in a first display (160A) of the plurality of displays (160) and rendering a second portion (224B) of the guest application (124) in a second display (160B) of the plurality of displays (160).

Example 16: The computing device of Example 15, wherein the instructions further cause the computing device to: while in the split-screen mode, determining that a size of the proxy application has been increased in at least one dimension; determining that resizing the guest application to the size of the proxy application would cause the guest application to no longer be displayed completely on an individual display of the plurality displays; relocating the guest application so that resizing the guest application to the size of the proxy application allows the guest application to be displayed completely on an individual display of the plurality of displays; and resizing the guest application to the size.

Example 17: The computing device of Example 16, wherein the guest application is relocated to a different display based on a determination that the new size of the proxy window will not fit on a current display where the guest application is rendered.

Example 18: The computing device of Example 15, wherein the instructions further cause the computing device to: store a resolution of each display of the plurality of displays, wherein the determination that the proxy application has begun spanning the plurality of displays is based on the resolution of each display.

Example 19: The computing device of Example 15, wherein the response to the determination that the proxy application has begun spanning the plurality of displays further includes: determining an offset from the location of the guest application to the location of the proxy application; receiving a first user interface command targeting the proxy application; generating a second user interface command targeting the guest application based on the first user interface command, wherein a first screen coordinate from the first user interface command is translated into a second screen coordinate based on the offset and included in the second user interface command; and invoking the second user interface command on the guest application.

Example 20: The computing device of Example 19, wherein the first screen coordinate is from a different display than the second screen coordinate.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
creating a proxy application on a desktop of a host operating system, wherein the proxy application displays content of and provides input commands to a guest application running in a desktop of a guest operating system;
synchronizing a location of the guest application on the desktop of the guest operating system with a location of the proxy application on the desktop of the host operating system;
determining that the proxy application has begun spanning a plurality of displays;
in response to the determination that the proxy application has begun spanning the plurality of displays:
entering a split-screen mode in which the location of the guest application is no longer synchronized with the location of the proxy application;
setting a location of the guest application so that the guest application remains within one of the plurality of displays;
while in the split-screen mode, rendering a first portion of the proxy application in a first display of the plurality of displays and rendering a second portion of the proxy application in a second display of the plurality of displays;
receiving a user interface command targeting the proxy application;
modifying a screen coordinate of the user interface command based on an offset of the location of the guest application and the location of the proxy application; and
forwarding the modified user interface command to the guest application.

2. The method of claim 1, further including:
while in the split-screen mode, determining that a size of the proxy application has been increased in at least one dimension;
determining that resizing the guest application to the size of the proxy application would cause the guest application to no longer be displayed completely on an individual display of the plurality of displays;
relocating the guest application so that resizing the guest application to the size of the proxy application allows the guest application to be displayed completely on an individual display of the plurality of displays; and
resizing the guest application to the size.

3. The method of claim 1, wherein synchronizing the location of the guest application comprises receiving an updated location of the proxy application and changing the location of the guest application to the updated location of the proxy application.

4. The method of claim 1, further comprising:
while in the split-screen mode, receiving an indication that the proxy application was moved to a new location;
determining that, at the new location, the proxy application spans a plurality of displays; and
leaving the location of the guest application unchanged.

5. The method of claim 1, further comprising:
while in the split-screen mode, receiving an indication that the proxy application was moved to a new location;
determining that, at the new location, the proxy application does not span two of the plurality of displays;
exiting the split-screen mode; and
setting the location of the guest application to the new location of the proxy application.

6. The method of claim 1, further comprising:
synchronizing a size of the guest application with a size of the proxy application, wherein the determination that the proxy application has begun spanning the plurality of displays comprises determining that the proxy application spans the plurality of displays based on a change in the size of the proxy application.

7. The method of claim 1, wherein a size of the guest application is fixed, further comprising:
receiving a resize indication that a size of the proxy application has changed;
determining a size ratio between the guest application and the proxy application; and
scaling the screen coordinate of the user interface command based on the size ratio between the guest application and the proxy application.

8. A computer-readable storage medium comprising instructions that, when executed by a processor, cause the processor to:
create a proxy application on a desktop of a host operating system, wherein the proxy application displays content of and provides input commands to a guest application running in a desktop of a guest operating system, wherein the guest operating system limits the guest application to a single display of a plurality of displays;
synchronize a location of the guest application on the desktop of the guest operating system with a location of the proxy application on the desktop of the host operating system;
determine that the proxy application has begun spanning the plurality of displays;
in response to the determination that the proxy application has begun spanning the plurality of displays:
  enter a split-screen mode in which the location of the guest application is no longer synchronized with the location of the proxy application;
  set a location of the guest application so that the guest application remains within one of the plurality of displays; and
  while in the split-screen mode, render a first portion of the guest proxy application in a first display of the plurality of displays and render a second portion of the guest proxy application in a second display of the plurality of displays.

9. The computer-readable storage medium of claim 8, wherein the location of the guest application is synchronized with the location of the proxy application as the proxy application is moved around the desktop of the host operating system.

10. The computer-readable storage medium of claim 8, wherein a size of the guest application is fixed, further comprising:
receiving a resize indication that a size of the proxy application has changed;
determining a size ratio between the guest application and the proxy application; and
scaling content generated by the guest application for display in the proxy application based on the size ratio.

11. The computer-readable storage medium of claim 8, wherein the response to the determination that the proxy application has begun spanning the plurality of displays further includes:
determining an offset from the location of the guest application to the location of the proxy application;
receiving a first user interface command targeting the proxy application;
generating a second user interface command targeting the guest application based on the first user interface command, wherein a screen coordinate from the first user interface command is translated based on the offset and included in the second user interface command; and
invoking the second user interface command on the guest application.

12. The computer-readable storage medium of claim 11, wherein the instructions further cause the processor to:
update the offset as the location of the proxy application changes and while the proxy application spans two or more of the plurality of displays.

13. A computing device comprising:
one or more processors;
a memory in communication with the one or more processors, the memory having computer-readable instructions stored thereupon which, when executed by the one or more processors, cause the computing device to:
  create a proxy application on a desktop of a host operating system, wherein the proxy application displays content of and provides input commands to a guest application running in a desktop of a guest operating system;
  synchronize a location and a size of the guest application on the desktop of the guest operating system with a location and a size of the proxy application on the desktop of the host operating system;
  determine that the proxy application has begun spanning a plurality of displays due to a change in size of at least one dimension of the proxy application;
  in response to the determination that the proxy application has begun spanning the plurality of displays due to a change in size of at least one dimension of the proxy application:
    enter a split-screen mode in which the location of the guest application is no longer synchronized with the location of the proxy application;
    set a location of the guest application so that the guest application remains within one of the plurality of displays; and
    while in the split-screen mode, render a first portion of the proxy application in a first display of the plurality of displays and render a second portion of the proxy application in a second display of the plurality of displays.

14. The computing device of claim 13, wherein the instructions further cause the computing device to:
determine that resizing the guest application to the size of the proxy application would cause the guest application to no longer be displayed completely on an individual display of the plurality displays;
relocate the guest application so that resizing the guest application to the size of the proxy application allows the guest application to be displayed completely on an individual display of the plurality of displays; and
resizing the guest application to the size.

15. The computing device of claim 14, wherein the guest application is relocated to a different display based on a determination that the new size of the proxy window will not fit on a current display where the guest application is rendered.

16. The computing device of claim 13, wherein the instructions further cause the computing device to:
store a resolution of each display of the plurality of displays, wherein the determination that the proxy application has begun spanning the plurality of displays is based on the resolution of each display.

17. The computing device of claim 13, wherein the response to the determination that the proxy application has begun spanning the plurality of displays further includes:
determining an offset from the location of the guest application to the location of the proxy application;
receiving a first user interface command targeting the proxy application;
generating a second user interface command targeting the guest application based on the first user interface command, wherein a first screen coordinate from the first user interface command is translated into a second screen coordinate based on the offset and included in the second user interface command; and
invoking the second user interface command on the guest application.

18. The computing device of claim 17, wherein the first screen coordinate is from a different display than the second screen coordinate.

* * * * *